US007974269B2

(12) United States Patent
Takeda et al.

(10) Patent No.: US 7,974,269 B2
(45) Date of Patent: Jul. 5, 2011

(54) MOBILE COMMUNICATION CONTROL METHOD AND MOBILE COMMUNICATION SYSTEM

(75) Inventors: Yukiko Takeda, Tokorozawa (JP); Shiro Tanabe, Hidaka (JP); Hui Deng, Beijing (CN); Hiroki Ikeda, Beijing (CN)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 11/211,593

(22) Filed: Aug. 26, 2005

(65) Prior Publication Data

US 2006/0077932 A1    Apr. 13, 2006

(30) Foreign Application Priority Data

Oct. 12, 2004    (CN) .......................... 2004 1 0085631

(51) Int. Cl.
*H04L 12/66*    (2006.01)
(52) U.S. Cl. ........ 370/352; 370/328; 370/338; 370/349; 370/351; 370/356; 370/389; 370/392; 709/202; 709/203; 709/217; 709/219; 709/227; 709/229; 709/230; 709/238; 709/245; 709/249; 455/432.1; 455/432.2; 455/432.3
(58) Field of Classification Search .................. 370/331, 370/329, 389, 466, 328, 338, 349, 351, 352, 370/353, 354, 356, 392, 401, 471; 709/220, 709/201, 202, 203, 206, 217, 219, 227, 228, 709/230, 238, 245; 455/436–444, 432.1, 455/432.2, 432.3, 433
See application file for complete search history.

(56) References Cited

U.S. PATENT DOCUMENTS

| | | | | |
|---|---|---|---|---|
| 6,915,325 | B1 * | 7/2005 | Lee et al. ...................... | 709/202 |
| 7,483,697 | B2 * | 1/2009 | Ohki ........................... | 455/432.1 |
| 7,542,481 | B2 * | 6/2009 | Faccin et al. .................. | 370/469 |
| 7,668,145 | B2 * | 2/2010 | Le et al. ........................ | 370/338 |
| 7,685,317 | B2 * | 3/2010 | Iyer ............................... | 709/248 |
| 2002/0009066 | A1 * | 1/2002 | Shimizu et al. ............... | 370/338 |

(Continued)

FOREIGN PATENT DOCUMENTS

JP    2002-223236    8/2002

(Continued)

OTHER PUBLICATIONS

Lee, Hyejeong, et al., "Mobility Management Based on the Integration of Mobile IP and Session Initiation Protocol in Next Generation Mobile Data Networks" Oct. 6-9 2003, Vehicular Technology Conference, 2003, VTC 2003-Fall. 2003 IEEE 58th, pp. 2058-2062 vol. 3.*

(Continued)

*Primary Examiner* — Olumide T Ajibade Akonai
(74) *Attorney, Agent, or Firm* — Stites & Harbison PLLC; Juan Carlos A. Marquez, Esq.

(57) ABSTRACT

The objective of the invention is to provide a mobile communication control method and mobile communication system in which mobile IPv6 and SIP are integrated by a core network of 3GPP2. In the mobile communication system, the mobile node MN executes a registration procedure for a Care-of-Address acquired in a visited network by the communication between the mobile node and a home agent server HA, executes a registration procedure for the Care-of-Address by the communication between the mobile node and an SIP server, and executes a communication procedure for session establishment by the communication between the mobile node MN and a correspondent node not through the home agent server but through the SIP server.

5 Claims, 11 Drawing Sheets

U.S. PATENT DOCUMENTS

| | | | |
|---|---|---|---|
| 2004/0105420 A1* | 6/2004 | Takeda et al. | 370/349 |
| 2004/0122976 A1* | 6/2004 | Dutta et al. | 709/245 |
| 2005/0091379 A1* | 4/2005 | Kim et al. | 709/227 |

FOREIGN PATENT DOCUMENTS

| | | |
|---|---|---|
| JP | 2004-120195 | 9/2002 |

OTHER PUBLICATIONS

Johnston et al., SIP Call Flow Examples (draft-ietf-sip-call-flows-05.txt), Jun. 2001, Internet Engineering Task Force, pp. 1-150.*

Elfin Wedlund, Henning Schulzrinne, Mobility Support using SIP, 1999, ACM, Proceedings of the 2nd ACM international workshop on Wireless mobile multimedia, International Workshop on Wireless Mobile Multimedia, pp. 76-82.*

Jin-Woo Jung, Ranganathan Mudumbai, Doug Montgomery, Performance Evaluation of Two Layered Mobility Management using Mobile IP and Session Initiation protocol, Dec. 1-5, 2003, Global Telecommunications Conference, 2003, Globecom '03. IEEE, vol. 3, pp. 1190-1194.*

Jin-Woo Jung, Doug Montgomery, Jung-Hoon Cheon, and Hyun-Kook Kahng, Mobility Agent with SIP Registrar for VoIP Services, Jan. 1, 2003, Springer Berlin/ Heidelberg, vol. 2713, (HSI, LNCS 2003, pp. 454-464), pp. 454-464.*

Office Action from Japanese Patent Office of Japanese Application No. 2005-116945, dated Aug. 6, 2010, in Japanese with English translation.

* cited by examiner

---------- : AIR INTERFACE
——————— : DATA FLOW

MOBILE COMMUNICATION CONTROL METHOD AND MOBILE COMMUNICATION SYSTEM

INCORPORATION BY REFERENCE

The present application claims priority from Chinese application CN200410085631.4 filed on Oct. 12, 2004, the content of which is hereby incorporated by reference into this application.

BACKGROUND OF THE INVENTION

The present invention relates to methods for mobile communication control and systems for mobile communication, and particularly to a mobile communication control method and mobile communication system in which mobile IPv6 and SIP (Session Initiation Protocol) are integrated by a core network of 3GPP2 (The 3rd Generation Partnership Project 2).

In the architecture of the third generation cellular network and the 3GPP2 of the International Standard System for the definition of standards, the mobile IPv4 (Internet Protocol version) for supporting the mobility of the terminal is already developed, but IPv6 does not take shape yet. However, the mobile IPv4 has some inherent problems, and thus how the mobile IPv6 is developed by 3GPP2 affords the key to the future mobile wireless data network.

The IP multimedia subsystem IMS has originally been defined by 3GPP, and even 3GPP2 employs the same IMS architecture. The IMS employs SIP (Session Initiation Protocol) for the establishment of session between terminals.

Figure 12:
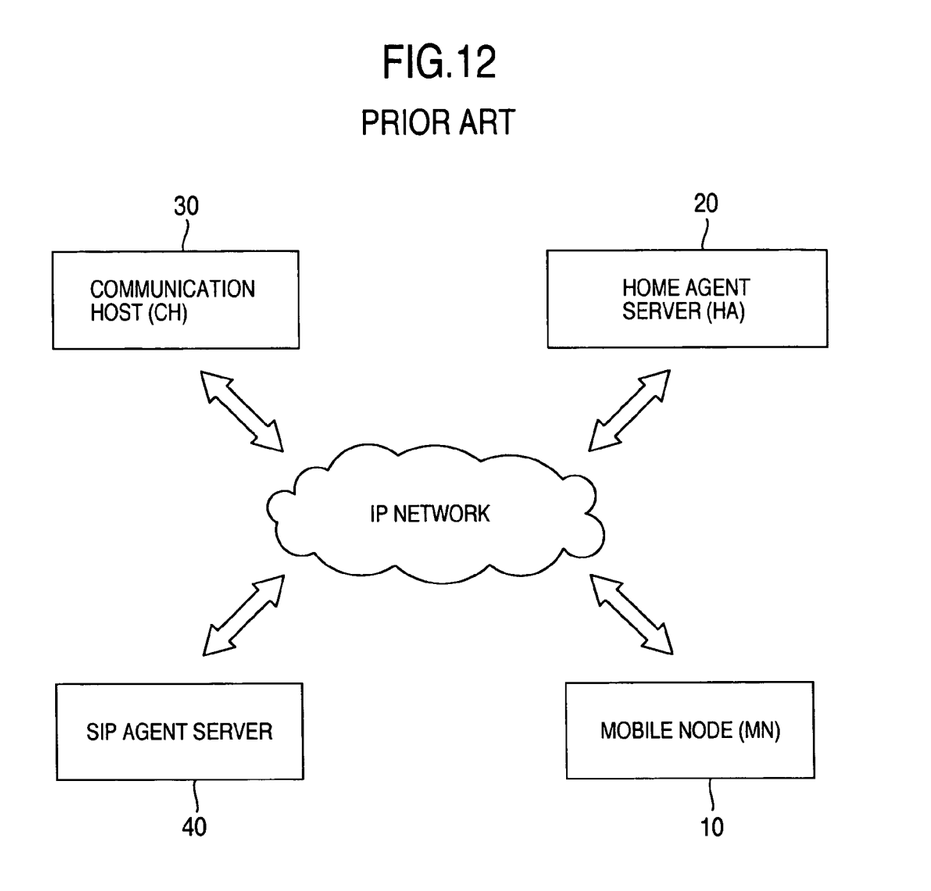
FIG. 12 is a diagram to which reference is made in explaining the IP network communication in the prior art.

JP-A-2004-120195 discloses a network communication method for the communication of a mobile node (MN) 10 with a communication host (CN) 30 through an IP network as shown in FIG. 12. In this method disclosed in JP-A-2004-120195, an SIP server 40 is provided in the network in order that the communication can be started by using the SIP. The mobile node 10, when connected to a network to which it moved, acquires a Care-of-Address CoA that this network manages, and notifies a home agent server (HA) 20 of the acquired Care-of-Address.

The communication host 30, at the communication start time, transmits a session connection request message (INVITE) to the SIP server 40 before it transmits a data packet (IP packet) to the mobile node 10. The session connection request message is transferred from the SIP server 40 to the home agent server 20, and then it is transferred from the home agent server 20 to the mobile node 10.

The mobile node 10 that received the session connection request message transmits a response message through the SIP server 40 to the communication host 30. When the communication between the communication host 30 and the mobile node 10 is started, the IP data packet that the communication node 30 transmitted is encapsulated in the home agent server 20, and transferred to the mobile node 10 according to the Care-of-Address.

In the communication method proposed in JP-A-2004-120195 all packets transmitted and received between the communication host 30 and the mobile node 10 are transferred through the home agent server 20 of the mobile node 10. Therefore, a triangle routing problem is caused, thus burdening the home agent server and whole network with a heavy communication load.

The SIP and mobile IPv6 both support the mobility of the mobile node MN, but they are different in supporting the mobility. In other words, since the mobile IPv6 is the protocol for IP layer, the TCP layer and the upper layers do not notice that the IP address is changed. Therefore, the application program cannot detect the movement of the mobile node MN. On the other hand, since the SIP is the protocol of the application layer, a re-request message (re-INVITE) can be used to recover the session intermitted as the mobile node MN moves. However, since this kind of standard cannot hide the change of IP address in the TCP layer, the TCP session is intermitted.

Since the mobile IPv6 is transparent to all applications, only the mobile IPv6 in the IMS system can support the normal movement session without the mobility support by the SIP. However, when the mobile node MN moves away from the home area to an external area, and located in that area, all the signaling process for connecting a new SIP session is sure to go through the home network. Therefore, useless routing occurs, thus causing a long delay of time and a heavy traffic load within the home agent HA.

It is an objective of the invention to provide a mobile communication control method and mobile communication system in which the mobile IPv6 and the SIP are integrated in a core network of 3GPP2.

It is another objective of the invention to provide a mobile communication control method and mobile communication system capable of reducing the load of the mobile node on the home agent and mobile communication network.

It is still another objective of the invention to provide a mobile communication control method and mobile communication system that makes it easy to register the position of the mobile node to the SIP server when a new Care-of-Address is acquired, and to connect the session.

SUMMARY OF THE INVENTION

In order to achieve the above objectives, the mobile communication control method according to the invention is characterized in that the mobile node executes a registration procedure for registering the Care-of-Address acquired in a visited network by the communication between the mobile node and the home agent server, executes a registration procedure for registering the Care-of-Address by the communication between the mobile node and the SIP server, and executes a communication procedure for session connection by the communication between the mobile node and the correspondent node not through the home agent server but through the SIP server.

In the first embodiment of the invention, the registration procedure for registering the Care-of-Address between the mobile node and the SIP server is carried out through the home agent, and the communication procedure for the session establishment is performed after the communication procedure for optimizing the mobile communication route is carried out between the mobile node and the SIP server.

In another embodiment of the invention, the registration procedure for registering the Care-of-Address between the mobile node and the SIP server is started by transmitting an SIP registration request (REGISTER) message from the mobile node to the SIP server with the Care-of-Address specified in the SIP contact header of the REGISTER message.

For more detail, the SIP registration request (REGISTER) message is transmitted in a form of IP packet having an IPv6 header from the mobile node to the SIP server. The IPv6 header includes the Care-of-Address as the source address, and the IP address of the SIP server as the destination address, and the home address of the mobile node in the extension header portion.

One feature of this invention is that the SIP session establishment request (INVITE) message for the session connection transmitted from the mobile node to the SIP server specifies the Care-of-Address of the mobile node by a connection definition. In this case, the correspondent node applies the Care-of-Address specified by the INVITE message to the destination IP address, thereby making it possible to transmit the data packet to the mobile node through the optimum route without passing through the home agent.

When the communication procedure for the session connection is started by the transmission of the SIP session establishment request (INVITE) message from the correspondent node to the SIP server, the SIP server updates the content of the start line of the received INVITE message from the SIP URI to the Care-of-Address of the mobile node, and then transfers the INVITE message to the mobile node. In this case, the mobile node that received the INVITE message transmits an SIP response message with the Care-of-Address specified by the connection definition back to the correspondent node. The correspondent node applies the Care-of-Address specified by the SIP response message to the destination IP address, thus making it possible to transmit the data packet to the mobile node through the optimum route.

The mobile communication system according to the invention has a home network connected to an IP network, and a plurality of visited networks connected to the IP network through packet data exchange nodes, respectively. The home network includes a home agent server for managing the location information of the mobile node, and the SIP (Session Initiation Protocol) server. The home agent server has means that receives the mobile IP location registration request message from the mobile node, and stores the binding information between the home address of the mobile node and the Care-of-Address. The SIP server has means that receives the SIP registration request message, and stores the matching relation between the SIP identifier of the mobile node and the Care-of-Address, and means that relays the SIP message for the session connection transmitted and received between the mobile node and the correspondent node without passing through the home agent server.

According to the invention, since the control procedure for the session establishment by the SIP server can be executed not through the home agent of the mobile node, the load on the home agent can be reduced. In addition, by applying the Care-of-Address to the mobile node registration request message to the SIP server and the session establishment request message, it is possible to make direct packet communications between the mobile node and the correspondent node not via the home agent, and thus to reduce the load on the communication network.

Other objects, features and advantages of the invention will become apparent from the following description of the embodiments of the invention taken in conjunction with the accompanying drawings.

DESCRIPTION OF THE INVENTION

Embodiments of the invention will be described in detail with reference to the accompanying drawings.

Figure 1:
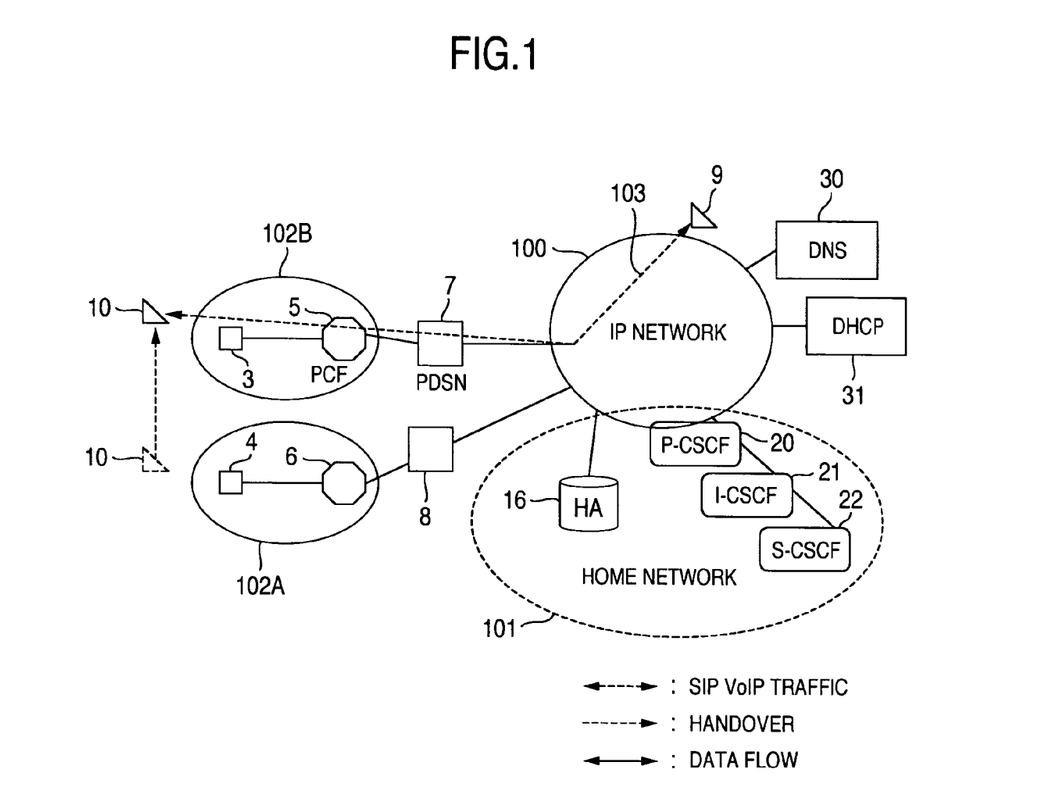
FIG. 1 is a diagram showing an example of the construction of the mobile communication network of the IMS system of 3GPP2 according to the invention.

FIG. 1 shows an example of the construction of a mobile communications network based on the IMS system of 3GPP2 to which this invention is applied. In FIG. 1, there are shown an IP network 100, a home network 101 of mobile IPv6, and access networks (visited networks) 102 (102A, 102B) located outside the home network.

The IMS network defined by 3GPP2 has user terminals 9, 10 (hereinafter, terminal 9 is referred to as a correspondent node CN, and terminal 10 as a mobile node MN), access points 3, 4 to which the mobile node is connected in their access networks, packet control function modules (PCF) 5, 6 that are respectively connected to the access points 3, 4, packet data switching nodes (PDSN) 7, 8 that are respectively connected to the PCF 5, 6, a home agent (HA) server 16, and an SIP server (20~22). The IP network is connected to a DNS (Domain Name System) server 30 and to a DHCP (dynamic Host Configuration Protocol) server 31 as other elements.

The function of the SIP server in the IMS system of 3GPP2 is divided into the P-CSCF (Proxy Call Session Control Function) 20, I-CSCF (Interrogating CSCF) 21, and S-CSCF (Serving CSCF) 22. A dotted line 103 with arrows at the ends indicates the flow of communication packets according to SIP VOIP.

In this invention, as will be described later in detail, each user terminal (mobile node MN) 10 is supported by mobile IPv6 and SIP application in its visited networks. The mobile node MN 10 is supported by the mobile IPv6 to be able to receive the prefix of IP address from the packet data switching node (PDSN) 8 through the access point (AP: Access Point) 4 and through the packet control function module (PCF: Packet Control Function) 6 in the visited network 102A. When the mobile node 10 moves from the visited network 102A to the visited network 102B, it acquires a new CoA (Care-of-Address) from the PDSN 7 of network 102B through AP 3 and PCF 5. The mobile IPv6 supports the user terminal so that the mobile node MN can continue to communicate with the correspondent node CN while it is moving.

Figure 2:
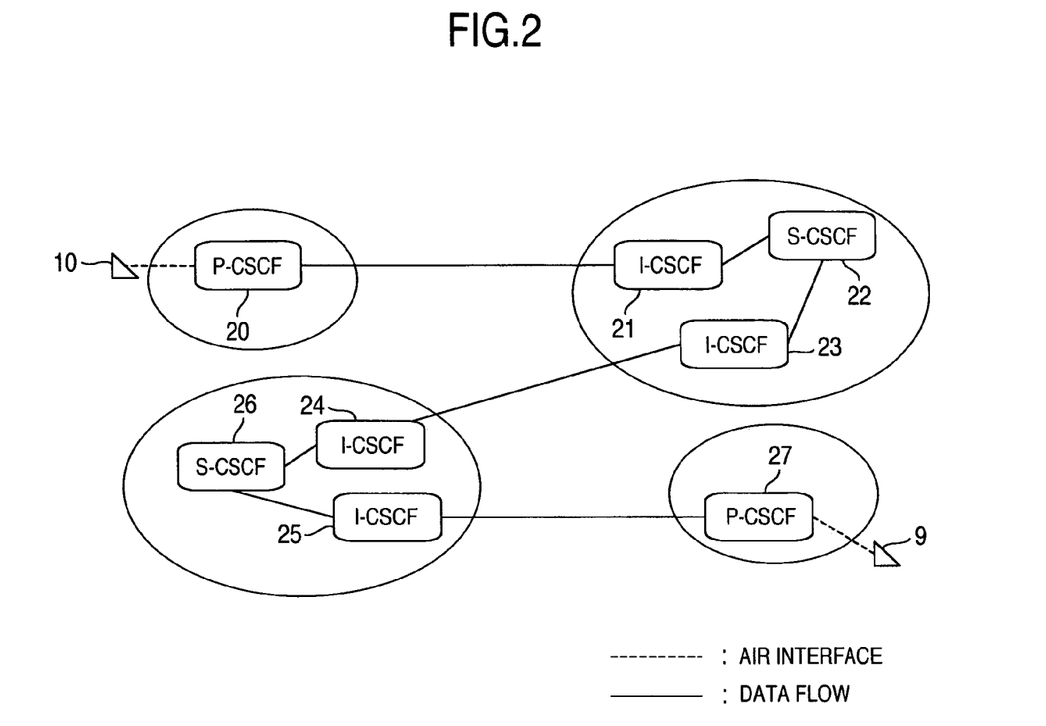
FIG. 2 is a distribution map of the actual SIP server.

FIG. 2 shows a distribution map of the actual SIP server.

The P-CSCF 20, 27 is the first connection point between the user terminal (MN 10 and CN 9) and the I-CSCF and S-CSCF provided within the IMS system. The I-CSCF 21, 23, 24 and 25 serve as connection points for all connections (object address) to the user in the network run by each communication enterprise. The network run by each communication enterprise is able to have a plurality of I-CSCFs as illustrated.

The S-CSCF 22 and 26 offer session control service for user terminals. The S-CSCF 22 and 26 are the actual control functions as the core of SIP server, and are used as SIP register (registration server) and SIP proxy (agent server).

The SIP server (CSCF) has the registration processing function in the application layer, and the control layer's processing function associated with the multimedia session of SIP base, and processes the calling request sent from other VoIP call control servers or a terminal of multimedia IP network.

Figure 3:
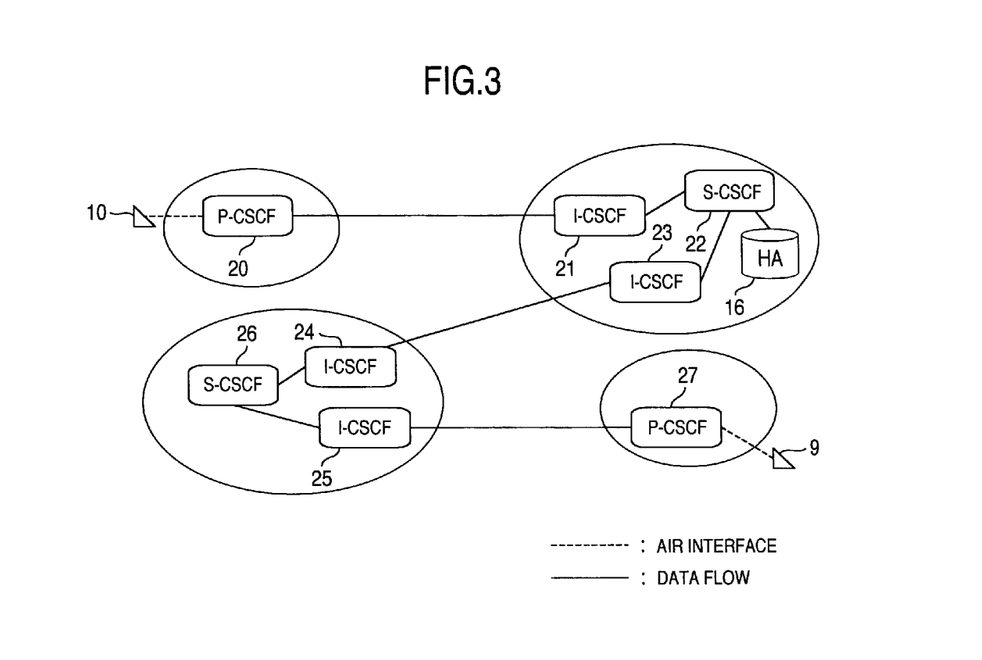
FIG. 3 is a diagram showing the relation between the actual SIP and the home agent HA of mobile IPv6.

FIG. 3 shows the relation of the actual SIP and the home agent HA of mobile IPv6. In FIG. 3, the home agent HA 16 of mobile IPv6 is additionally connected to the S-CSCF 22 shown in FIG. 2.

Figure 4:
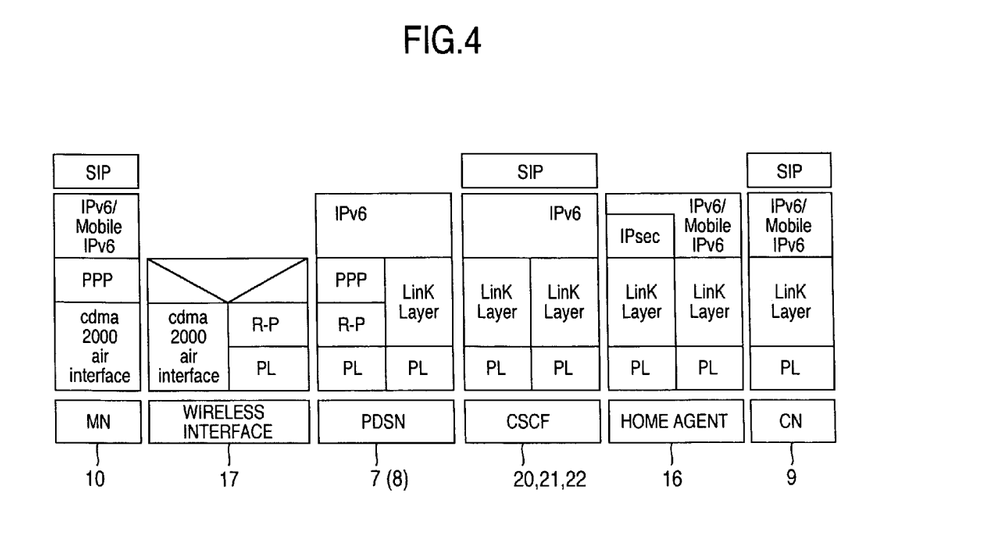
FIG. 4 is a diagram showing the protocol stack of each apparatus regarding the SIP signaling procedure according to the invention.

FIG. 4 shows the protocol stack of each apparatus relevant to the SIP signaling procedure according to the invention. FIG. 4 shows the protocol stack of each apparatus in the architecture of 3GPP2. The protocol of this reference model is very much like the mobile IPv4 in the IMS system of 3GPP2, and proposes a solution for mobile IPv6 in the 3GPP2 environment.

The mobile node (MN) 10 can acquire IPv6 address by a different method such as stateless address autoconfiguration (Neighbor Discovery) or stateful address autoconfiguration using DHCP (v6). The mobile node MN has the protocol stack of PPP, mobile IP6 and SIP. The input/output data packet of mobile IPv6 and SIP protocol stack is encapsulated by PPP protocol stack.

A wireless network (wireless interface) 17 directly transmits ppp data packets. When the data packets arrive at PDSN 7 (or 8), the ppp protocol stack ends. The CSCF does not need to support mobile IPv6, but needs to support only the SIP protocol stack. The correspondent node CN 9 has the stack of ppp, mobile IPv6 and SIP. The input/output data packets of mobile IPv6 and SIP protocol stack are encapsulated by PPP protocol stack.

Figure 5:
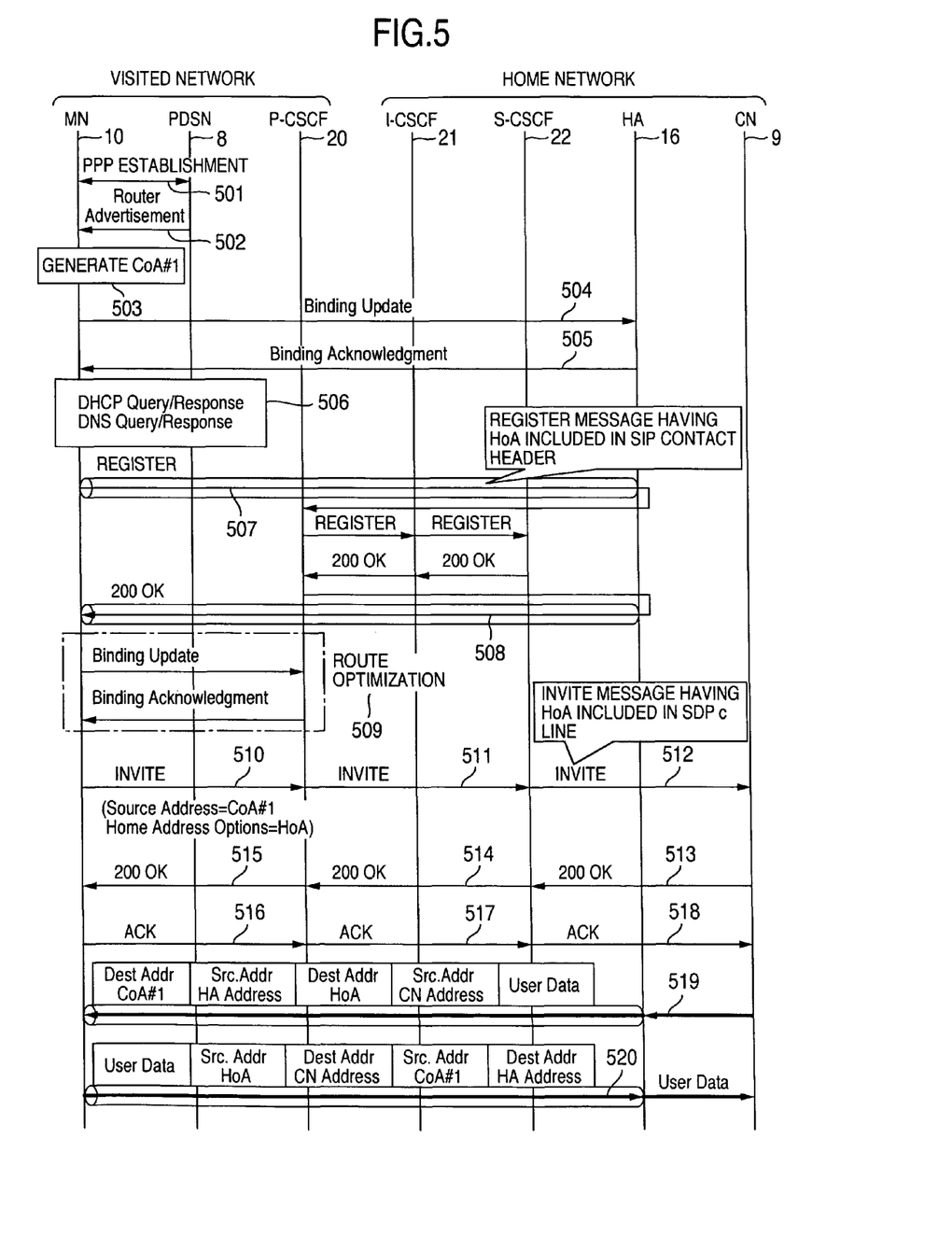
FIG. 5 is a diagram showing the SIP session establishment sequence in the first embodiment of the invention.
Figure 6:
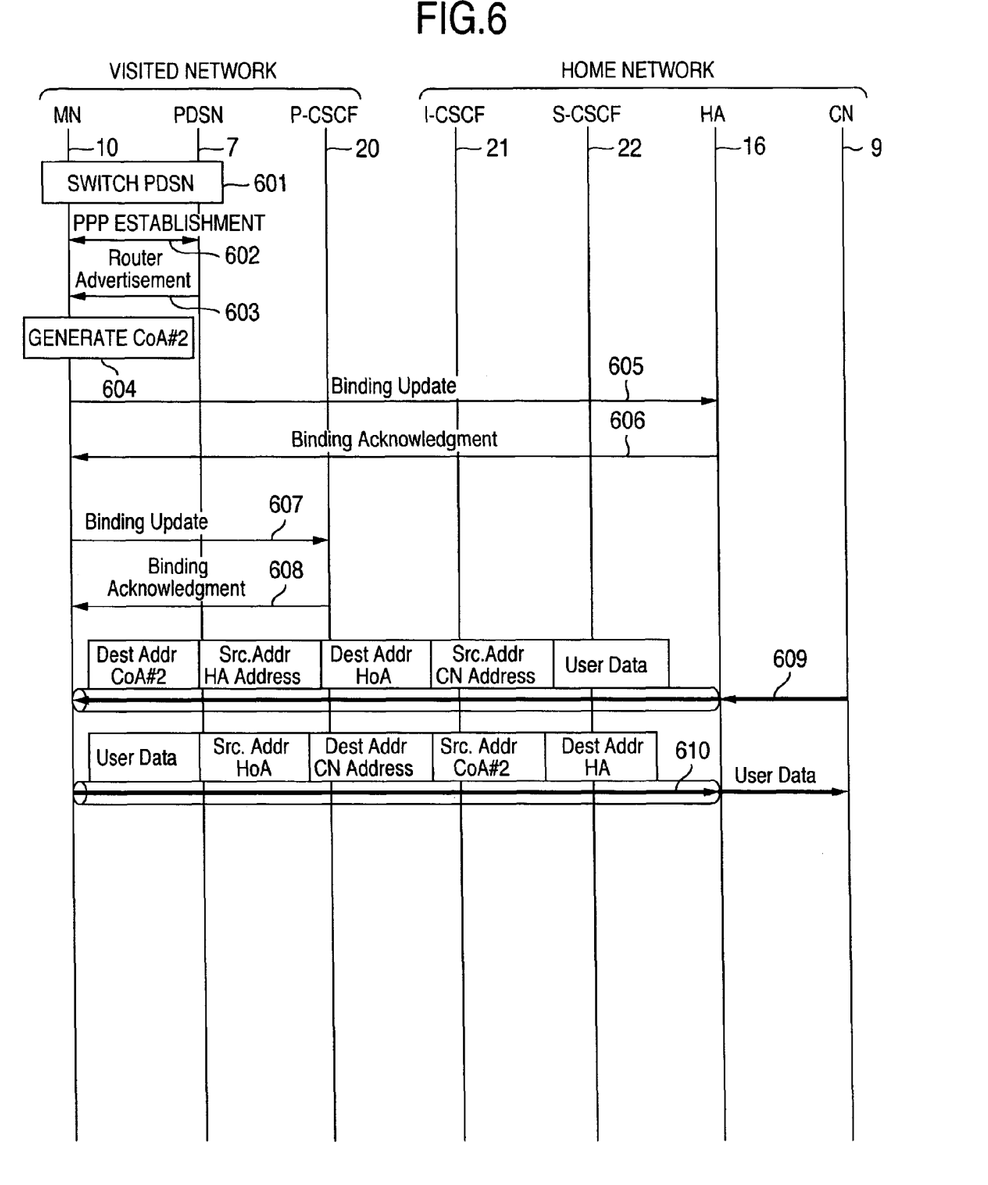
FIG. 6 is a diagram showing the communication sequence in the case where a handover occurs in the first embodiment.

FIG. 5 and 6 show the first embodiment of the SIP session establishing sequence according to the invention. This establishment sequence works with the home agent HA of mobile IPv6 in the IMS subsystem of 3GPP2.

With reference to FIG. 5, description will be made of the SIP session establishing sequence that the mobile node MN 10 performs in the visited network (access network) 102A shown in FIG. 1.

When PPP connection is established between the mobile node MN 10 and PDSN 8 (501), the PDSN 8 broadcasts the prefix of network IPv6 address through a router advertisement message (502). When the mobile node MN 10 receives the broadcast network prefix (502), it uses, for example, the stateless address autoconfiguration mechanism to generate a new Care-of Address CoA#1 (503).

After generating the above Care-of Address CoA#1, the mobile node MN 10 uses mobile IPv6 mechanism to transmit a binding update message for location registration to the home agent server HA 16 (504). When receiving the update message, the home agent server HA 16 orders the binding update table to store the matching relation of the Care-of Address CoA#1 and the home address, and transmits a binding acknowledgment message back to the mobile node MN 10 (505).

When receiving the above binding acknowledgment message, the mobile node MN 10 requests a DHCP (Dynamic Host Configuration Protocol) server 31 to send DNS server name and P-CSCF domain name (FQDN: Fully Qualified Domain Name) (request message: DHCP Query). When receiving the response message (DHCP Response) from the DHCP server 31, the mobile node MN 10 requests the DNS server specified by the received message to send the IP address of SIP server (specifically P-CSCF) corresponding to the FQDN specified (request message: DSN Query).

The mobile node MN 10 can thus acquire the IP address of SIP server (P-CSCF 20) by receiving the response message (DNS Response) from the DNS server (506). If the mobile node MN 10 cannot acquire the IP address of P-CSCF by receiving the response message from the DNS server, it repeats to send the same request to another DNS server included within the response message sent from the DHCP server 31, and acquires the IP address of P-CSCF.

In this embodiment, the mobile node MN 10 utilizes the IP address of SIP server (P-CSCF 20) and its own home address HoA to generate an SIP registration request message (REGISTER), encapsulates this request message by the outer IP header with the IP address of home agent HA 16 used as the destination address, and transmits it to the HA 16 (tunnel transfer 507).

The SIP message is set in the payload of the IP packet that has IP (IPv6) header and TCP/UDP header. The SIP message includes the start line that indicates the kind of message (Request-Method) and message destination (SIP-URI), the header portion that describes the content of request or response, and the message body (SDP: Session Description Protocol) that describes the connection definition information (c; connection, m; media, a; attribute).

The kind of SIP message described in the start line includes, for example, "REGISTER" indicative of registration request message, "INVITE" indicative of session establishment request message, "BYE" indicative of disconnection request message of session, "200 OK" indicative of response message, "ACK" indicative of connection confirmation message, and "INFO" indicative of special information notice message.

The header portion includes, for example, Via-header indicative of the route of SIP message, To-header indicative of message destination, From-header indicative of source, Call-ID indicative of connection identifier specified at source, Contact-header indicative of URI of the client terminal to be registered in SIP server, and Content-Type and Content-Length headers that define the following message body 803.

The REGISTER message that the mobile node MN 10 transmits to P-CSCF 20 has in the header portion the Contact-header including the home address HoA of mobile node MN 10, and the To-header and From-header that include SIP-URI of mobile node MN 10. The IP header added to the REGISTER message includes IP address of P-CSCF 20 as the destination IP address, and home address HoA as the source address. The outer IP header includes the IP address of HA 16 as the destination address, and the Care of Address CoA#1 of mobile node MN 10 as the source address.

The encapsulated packet is decapsulated at the home agent HA 16, and transferred as the IP packet containing REGISTER message to P-CSCF 20. The above IP packet is further transferred from the P-CSCF 20 to the I-CSCF 21, and from the I-CSCF 21 to the S-CSCF 22.

When receiving the above REGISTER message, the S-CSCF 22 checks the effectiveness of the received message, causes the relation between the SIP-URI and IP address HoA of the mobile node to be stored in the SIP information management table (SIP registration), and then generates the SIP response message (200 OK) to the mobile node MN. The IP packet containing the above response message takes the route opposite to the REGISTER message, or it is transferred to the I-CSCF 21, P-CSCF 20 and then home agent HA 16 where it is encapsulated. The encapsulated IP packet is transferred to the mobile node MN 10 (508).

In this embodiment, when the above registration sequence is completed, the mobile node MN 10 transmits the optimization message (Binding Update) to the P-CSCF 20 of SIP server in order to optimize the route of mobile IPv6. The IP packet containing the Binding Update message uses the IP address of P-CSCF 20 as the destination address and the Care of Address CoA#1 of mobile node 10 as the source address in the IP header. When receiving the above Binding Update message, the P-CSCF 20 transmits the response message (Binding Acknowledgement) back to the mobile node 10. When the mobile node 10 receives the above response message, the route optimization (509) is completed, and thus the P-CSCF 20 and mobile node MN 10 can directly communicate with each other.

Before the transmission and reception of packets to and from the correspondent node CN, the mobile node MN 10 transmits session establishment request message (INVITE) to the SIP server (510). The INVITE message has the home address HoA of mobile node MN 10 contained in the c-line of message body (SDP). The IP header contains the IP address of P-CSCF 20 as the destination address, and the Care of Address CoA#1 of mobile node MN 10 as the source address. The extension header portion of the IP header may describe the home address HoA of mobile node MN 10.

The IP packet including the above INVITE message is transmitted not through the home agent HA 16 unlike the REGISTER message 507, but directly transmitted from the mobile node MN 10 to the P-CSCF 20, transferred from the P-CSCF 20 to the S-CSCF 22 (via the I-CSCF 21) (511), and then transferred from the S-CSCF 22 to the correspondent node CN 9 (512).

The correspondent node CN 9 that has received the above INVITE message transmits the IP packet including the response message (200 OK) back to the mobile node MN (513). The above response message (200 OK) is passed through the route opposite to the INVITE message, or transferred through the S-CSCF 22 and P-CSCF 20 to the mobile node MN 10 (514, 515). When receiving the above response message (200 OK), the mobile node MN 10 transmits the IP packet including the ACK message back to the correspondent node CN 9 (516). The IP packet including the ACK message is transferred to the correspondent node CN 9 through the same route as the INVITE message (517, 518).

When the correspondent node CN 9 receives the ACK message, the correspondent node CN 9 and mobile node MN 10 can transmit and receive data to and from each other.

The correspondent node CN 9 transmits data packet with the home address HoA of mobile node MN 10 used as the destination IP address (519). The data packet is caught by the home agent HA 16. Then, as illustrated, it is encapsulated by the outer IP header that has the Care-of-Address CoA1 of mobile node MN 10 used as the destination address and the IP address of HA 16 used as the source address. This encapsulated data packet is transferred in a tunnel mode to the mobile node MN 10.

When the data packet is transmitted from the mobile node MN 10 to the correspondent node CN 9, the home address HoA is used for the source address of IP header, and the IP address of CN is used for the destination address. The above transmitted packet is encapsulated by the outer IP header that has the Care-of-Address CoA#1 of mobile node MN 10 used as the source address and the IP address of home agent HA 16 used as the destination address. This encapsulated packet is transferred in the tunnel mode to the home agent HA 16 (520).

The home agent HA 16 decapsulates this encapsulated packet, and transfers it to the correspondent node CN 9.

FIG. 6 shows the communication sequence in the case where the mobile node MN 10 moves from the visited network 102A to another visited network 102B as shown by the arrows in FIG. 1, so that a handover (switching from PDSN 8 to PDSN 7) 601 occurs.

When the mobile node MN 10 establishes PPP connection to the PDSN 7 to which it has moved (602), the PDSN 7 broadcasts the network prefix by means of the router advertisement message (603). When receiving the above network prefix, the mobile node MN 10 generates a new Care-of-Address CoA#2 by, for example, the stateless address auto-configuration (604).

After generating the above Care-of-Address CoA#2, the mobile node MN 10 transmits a Binding Update message to the home agent HA 16 by means of mobile IPv6 mechanism (605). The home agent server HA 16 that received the update message causes the binding update table to store the matching relation of the Care-of-Address CoA#2 and the home address, and then transmits the binding acknowledgment message to the mobile node MN 10 (606).

When the location registration sequence is completed, the mobile node MN 10 transmits the binding update message for route optimization to the SIP server (P-CSCF 20) of which the IP address is already known (607). The IP header added to the above binding update message includes the IP address of P-CSCF 20 as the destination address, and the Care-of-Address CoA#2 of mobile node MN 10 as the source address. When receiving this binding update message, the P-CSCF 20 transmits the response message (binding acknowledgement) back to the mobile node 10 (608). The mobile node MN 10 receives the above response message, so that the mobile node MN 10 and the SIP server (P-CSCF 20) can directly communicate with each other.

The home agent HA 16 has the new Care-of-Address CoA#2 stored corresponding to the home address HoA of mobile node MN 10 as a result of the location registration (605, 606) of mobile node MN 10 in the above visited network 102B. Therefore, the IP packet the correspondent node CN 9 subsequently transmits to the mobile node MN 10 is encapsulated in the home agent HA 16 by the outer IP header using CoA#2 as the destination address as illustrated. The encapsulated IP packet is transferred through the new PDSN 7 to the mobile node MN 10.

When the mobile node MN 10 transmits data packet to the correspondent node CN 9 (610), the home address HoA is used for the source address of IP header, the IP address of CN for the destination address, and the new Care-of-Address CoA#2 for the source address of the outer IP header.

Figure 7:
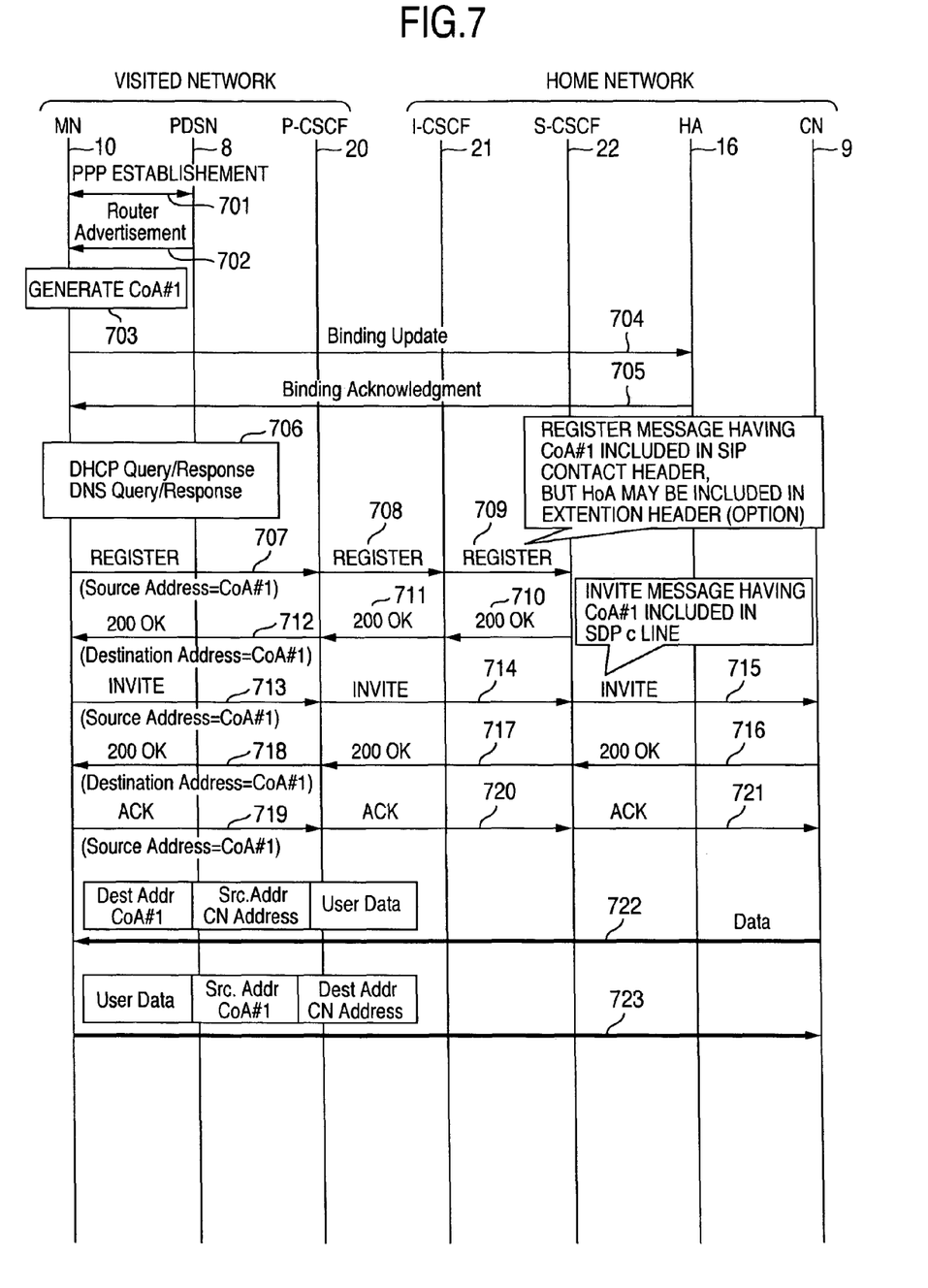
FIG. 7 is a diagram showing the SIP session establishment sequence in the second embodiment of the invention.
Figure 8:
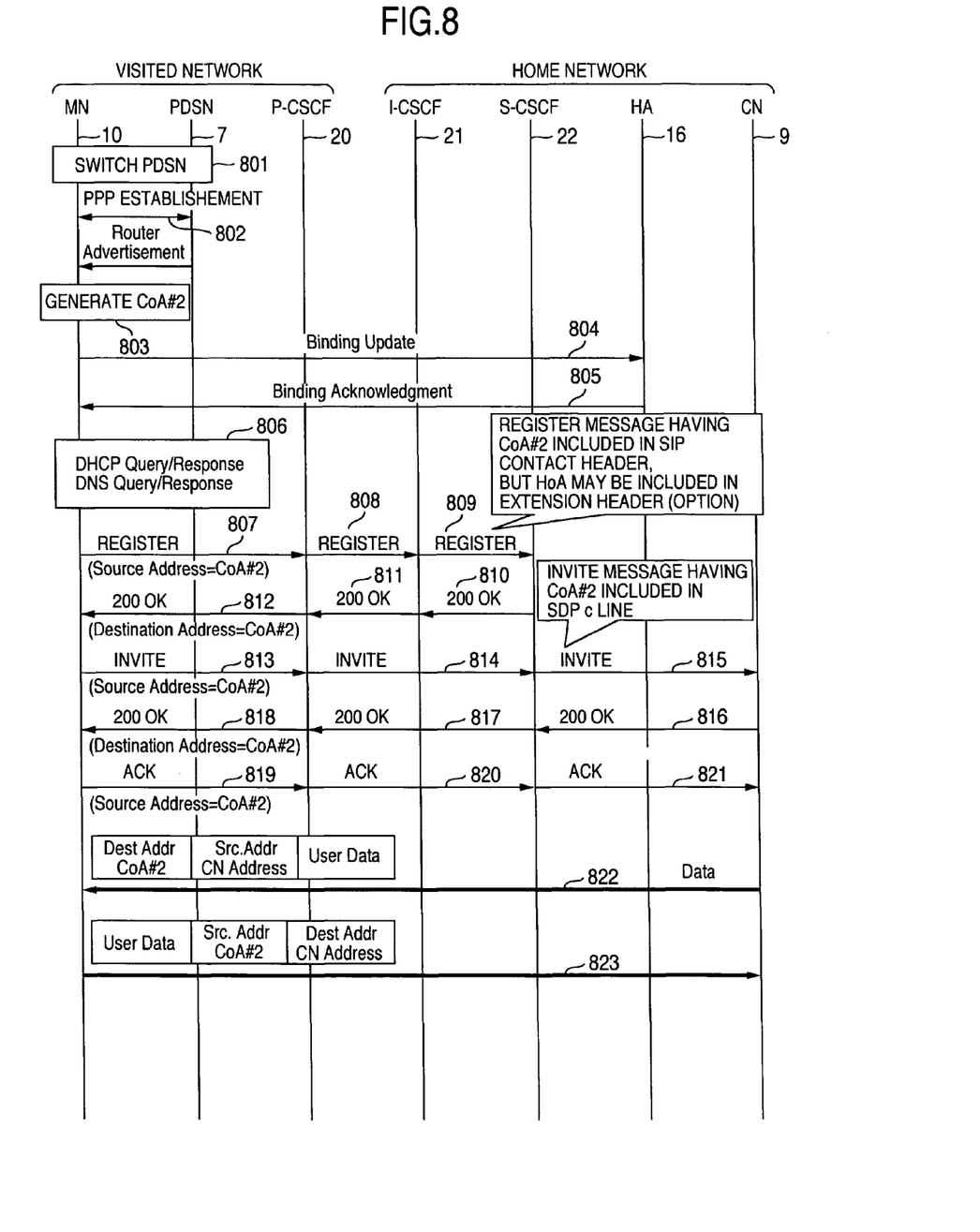
FIG. 8 is a diagram showing the communication sequence in the case where a handover occurs in the second embodiment.
Figure 9:
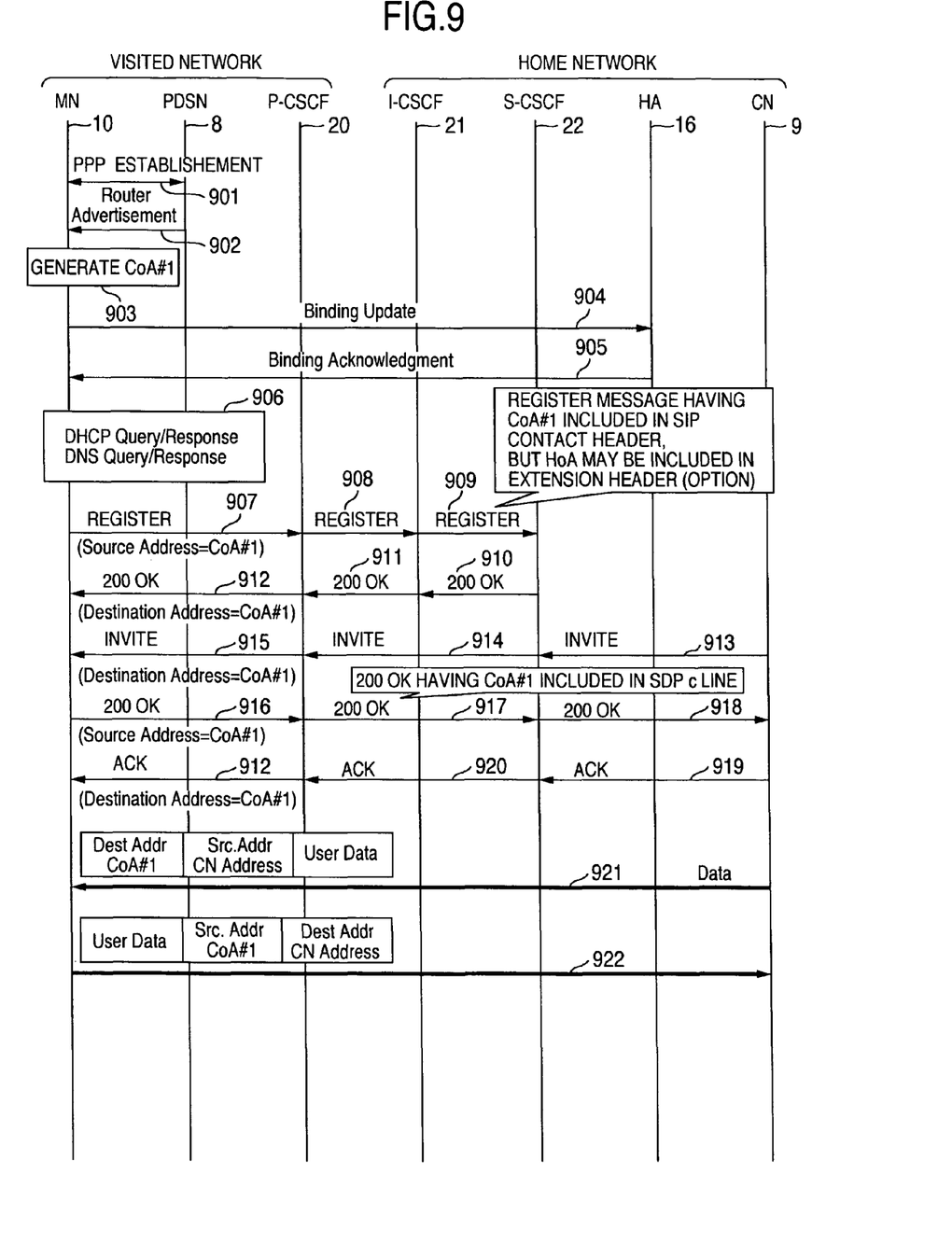
FIG. 9 is a diagram showing the communication sequence in the case where the correspondent node side sends a request for session connection in the second embodiment.

FIGS. 7 through 9 show the second embodiment of the SIP session establishment sequence according to the invention in the IMS subsystem of 3GPP2. The feature of the second embodiment is that the communications between the mobile node MN 10 and the SIP server 2 and between the mobile node MN 10 and the correspondent node CN 9 can be made through the optimum route without passing through the home agent HA 16.

The SIP session establishment sequence the mobile node MN 10 makes in the visited network (access network) shown in FIG. 1 will be first described with reference to FIG. 7.

The sequence (701 through 706) is carried out from when the mobile node MN 10 establishes PPP session to the PDSN 8 and registers the location in the home agent HA 16 to when the node MN 10 communicates with the DHCP server and DNS server to acquire the IP address of P-CSCF 20. This sequence is the same as the sequence 501 through 506 in the first embodiment.

In the second embodiment, the mobile node directly requests the SIP server (P-CSCF 20) to register the position in SIP (707). The registration request message (REGITER) has the Care-of-Address CoA#1 of mobile node MN 10 included in the Contact header of the header portion. In addition, the IP address of P-CSCF 20 is used for the destination address of IP header (IPv6), and the Care-of-Address CoA#1 of mobile node MN 10 for the source address. However, the IPv6 extension header portion optionally may include the home address HoA of mobile node MN 10. The home address HoA can be used for the route optimization when the mobile node MN is handover.

The IP packet including the above REGISTER message is transferred from the P-CSCF 20 through the I-CSCF 21 to the S-CSCF 22 (708, 709). The S-CSCF 22, when receiving the REGISTER message, checks the effectiveness of the received message, and causes the SIP information management table to store the relation between the SIP-URI and IP address HoA of the mobile node (SIP registration). Then, it generates the SIP response message (200 OK) to the mobile node MN. The IP package including the above response message, contrary to the REGISTER message, is transferred through the I-CSCF 21 and P-CSCF 20 to the mobile node MN 10 (710 through 712).

In this embodiment, since the mobile node MN 10 and SIP server makes direct communications through the optimum route in which the Care-of-Address CoA#1 of mobile node MN 10 is used in the IP header as described above, it is not necessary to optimize the route of mobile IPv6 corresponding to the sequence 509 of the first embodiment.

The mobile node MN 10, before the communication with the correspondent node CN, transmits the session establishment request message (INVITE) to the SIP server (713). In this embodiment, the INVITE message has the Care-of-Address CoA#1 of mobile node MN 10 included in the c-line of the message body portion, the IP address of P-CSCF 20 used as the destination address included in the IP header, and the Care-of-Address CoA#1 of mobile node MN 10 used as the source address.

The IP packet including the INVITE message is transferred from the P-CSCF 20 to the S-CSCF 22 (714), and then from the S-CSCF 22 to the correspondent node CN 9 (715). The correspondent node CN 9 that received the INVITE message transmits the IP packet including the response message (200 OK) back to the mobile node (716). The response message (200 OK) is transferred through the route opposite to the INVITE message, or transferred through S-CSCF 22 and P-CSCF 20 to the mobile node MN 10 (717, 718). When receiving the response message (200 OK), the mobile node MN 10 transmits the IP packet including the ACK message back to the correspondent node CN 9 (719). The IP packet including the ACK message is transferred to the correspondent node CN 9 through the same route as the INVITE message (520, 721).

When the correspondent node CN 9 receives the ACK message, the correspondent node CN 9 can transmit data to or receive from the mobile node MN 10.

In this embodiment, the correspondent node CN 9 transmits (722) data packet to the mobile node MN 10 by using as the destination address the Care-of-Address CoA#1 specified in the INVITE message (715). On the other hand, the mobile node MN 10 transmits data packet to the correspondent node CN 9 by using the Care-of-Address CoA#1 for the source address of IP header and the IP address of CN for the destination address (723). Therefore, these data packets are transferred to the destination nodes without passing through the home agent HA 16.

FIG. 8 shows the communication sequence of the case where a handover 801 occurs (switching is made from PDSN 8 to PDSN 7) when the mobile node MN 10 moves from the visited network 102A to another visited network 102B.

When the mobile node MN 10 establishes PPP connection to the PDSN 7 to which the mobile node moved (802), it receives the network prefix from PDSN 7 by the router advertisement message, and generates the new Care-of-Address CoA#2 by the stateless address autoconfiguration mechanism (803).

The mobile node MN 10 uses the Care-of-Address CoA#2, and transmits the location registration (binding update) message of mobile IPv6 to the home agent HA according to the same sequence as the sequence 701 through 706 shown in FIG. 7 (804). Then, it receives the binding response (binding acknowledgement) message from the home agent server HA 16 (805). At this time, it communicates with the DHCP server and DNS server to acquire the IP address of P-CSCF 20 (806).

Subsequently, the mobile node MN 10 executes the SIP registration procedure while communicating with the SIP server (P-CSCF 20, I-CSCF 21 and S-CSCF 22) (807 through 812), and carries out the session establishment procedure to the correspondent node CN 9 through the SIP server (813 through 821). These procedures are the same as the sequence (707 through 721) shown in FIG. 7 except that the Care-of-Address is changed to CoA#2.

The correspondent node CN 9 transmits data packets to the mobile node MN 10 with the Care-of-Address CoA#2 specified by the INVITE message (815) being used as the destination IP address (822). On the other hand, the mobile node MN 10 transmits data packets to the correspondent node CN 9 with the Care-of-Address CoA#2 used as the source address of IP header and with the IP address of CN used as the destination address (823).

According to the second embodiment, since the Care-of-Address (CoA#1 or CoA#2) of mobile node MN 10 is used in the SIP message (REGISTER, 200 OK) and the IP packet including this message when the SIP registration sequence is performed between the mobile node and SIP server, it is not necessary to execute the procedure for the route optimization in the mobile IPv6 between the mobile node MN 10 and the P-CSCF 20.

In addition, since the Care-of-Address value of mobile node MN 10 is specified in the c-line of the message body portion of the INVITE message during the session establishment sequence that is executed before the data transmission and reception between the nodes, direct data communication between the nodes can be made not via the home agent.

As illustrated in the sequence diagram of FIG. 8, the mobile node MN 10 communicates with the DHCP server and DNS server at each occurrence of handover to acquire the IP address of P-CSCF 20 so that the same communication control procedure can be taken when the mobile node MN 10 acquires a new Care-of-Address (806). In this case, when the IP address of P-CSCF 20 is already acquired, the communication with the DHCP server and DNS server can be omitted.

FIG. 9 shows the sequence of the case where the correspondent node CN 9 sends the establishment request message (INVITE) of session in the SIP session establishment sequence of the second embodiment.

As illustrated in FIG. 9, the sequence (901 through 912) from when the ppp connection is established between the mobile node MN 10 and the PDSN 8 to when the registration procedure is completed between the mobile node and the SIP server (P-CSCF 20, I-CSCF 21 and S-CSCF 22) is carried out in the same way as the sequence 701 through 712 shown in FIG. 7.

It is assumed that the SIP server (S-CSCF 22) received the session establishment request message (INVITE) 913 to the mobile node MN 10 from the correspondent node CN 9 after the registration to the SIP server is completed. In this case, the INVITE message includes the SIP-URI indicating the destination mobile node MN 10 in the start line. The S-CSCF 22, when receiving the INVITE message, searches the SIP information management table for the entry corresponding to the SIP-URI specified by the received message, identifies the Care-of-Address CoA#1 of mobile node MN 10, and updates the content of the INVITE message from the SIP-URI to the above Care-of-Address CoA#1. The INVITE message including the Care-of-Address CoA#1 is transferred through the P-CSCF 20 to the mobile node MN 10 (914, 915).

When the mobile node MN 10 receives the INVITE message, it transmits the SIP response message (200 OK) back to the SIP server (916). The 200 OK message has the Care-of-Address CoA#1 included in the c-line of the message body portion (SDP portion) and the Care-of-Address CoA#1 used as the source address of the IP header. The 200 OK message is transferred through the SIP server (P-CSCF 20, and S-CSCF 22) to the correspondent node CN 9 (917, 918). The correspondent node 9 that received the 200 OK message transmits the ACK message back to the SIP server (919). The ACK message is transferred through the SIP server (S-CSCF 22, P-CSCF 20) to the mobile node MN 10 same as the INVITE message (920, 921).

In this embodiment, when the correspondent node CN 9 receives the 200 OK message, it recognizes the address of mobile node MN 10 as CoA#1, and thus it transmits data packets with this CoA#1 used as the destination address (921). This data packet is transferred to the mobile node MN 10 without passing through the home agent HA 16. On the other hand, the mobile node can also directly transmit the data packet to the correspondent node CN 9 with the IP address of correspondent node CN 9 specified in the c-line of the INVITE message being used for the destination address and with CoA#1 used for the source address (922).

Figure 10:
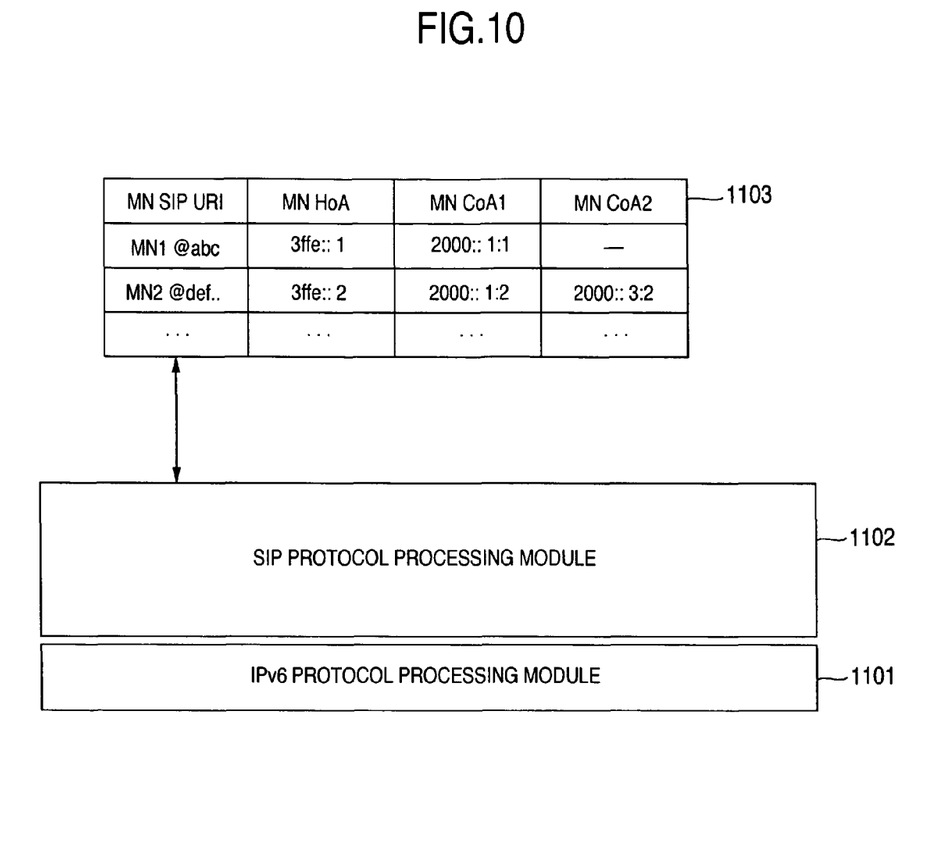
FIG. 10 is a diagram showing the constituent elements of the S-CSCF as the main body of SIP server according to the invention.

FIG. 10 shows the main constituent elements regarding this invention that is of the main body, S-CSCF 22 of the SIP server.

The S-CSCF 22 has a protocol process module 1101 of IPv6 and an SIP protocol process module 1102 as program modules to be executed by a processor according to the invention. Shown at 1103 is an SIP information management table that is incidental on the SIP protocol process module 1102.

The SIP information management table 1103 is formed of a plurality of entries corresponding to mobile nodes. Each entry corresponds to the SIP identifier (SIP-URI) of mobile node MN, and shows the home address HoA and Care-of-Address of the mobile node MN, and other information (for example, Call-ID, entry available period, P-CSCF address information and so on).

When the SIP message is received, this table is used to search for the home address HoA corresponding to the SIP-URI that the received message indicates or for the Care-of-Address corresponding to the SIP-URI and HoA. The value of the Care-of-Address (CoA1, CoA2) is updated when the REGISTER message is received. If the Care-of-Address can be stored in such a plurality of addresses as CoA1 and CoA2 before and after the handover, the PDSNs can be smoothly switched.

Figure 11:
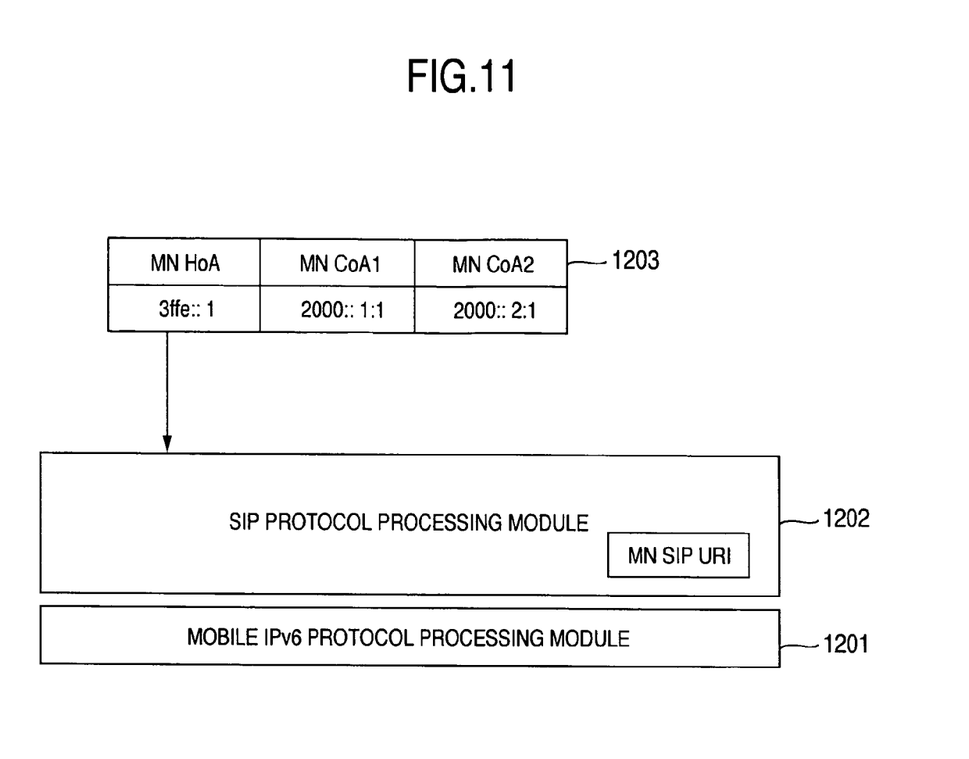
FIG. 11 is a diagram showing the main constituent elements of the mobile node MN according to the invention.

FIG. 11 shows the main constituent elements of mobile node MN 10 according to the invention.

The mobile node MN 10 has a protocol process module 1201 of mobile IPv6, and an SIP protocol process module 1202 as program modules to be executed by a processor according to the invention. Shown at 1203 is a binding update table that accompanies the SIP protocol process module 1202.

When the conventional mobile node (mobile terminal) that supports mobile IPv6 and SIP acquires a new Care-of-Address CoA when the terminal user moves, the REGISTER message with the home address HoA used in the contact header is sent to the SIP server, requesting for the registration as for example shown in FIG. 5 in step 507. In addition, when a new session is established between the mobile node and the correspondent node, the INVITE message with the home address HoA used in the c-line is transmitted to the SIP server, requesting for session.

The mobile node 10 in the first embodiment of the invention is provided with the function that when the position registration to the SIP server is completed (the 200 OK message is received), automatically it transmits the binding update message of mobile IPv6 to the SIP server (P-CSCF).

Alternatively, the mobile node 10 in the second embodiment of the invention is provided with the function that when it acquires a new Care-of-Address CoA, the REGISTER message with the Care-of-Address CoA used in the contact header is transmitted to the SIP server, directly requesting for the position registration, or when a new session is established between the mobile node and the correspondent node, the INVITE message with the Care-of-Address CoA used in the c-line is transmitted to the SIP server, directly requesting for the session.

These functions necessary for the invention can be added by slight modification of SIP protocol process module 1202 or by modification of the sequence control routine that controls the SIP protocol process and mobile IPv6 protocol process to be executed.

As we can understand from the above embodiments, the first embodiment can reduce the amount of communication of signaling information between the home agent HA and the SIP server in the IMS system of 3GPP2. In addition, according to the second embodiment, the efficiency of the IMS system can be greatly improved since the triangle routing of data packet passing through the home agent HA can be eliminated as well as the communication of signaling information between the home agent HA and SIP server is improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for controlling mobile communication in a communication network that includes a home agent server for managing location information of a mobile node, and a SIP (Session Initiation Protocol) server, said method comprising the steps of:

sending a first registration request message which requests a registration of a Care-of-Address acquired in a visited network from said mobile node to said home agent server;

matching said Care-of-Address of said mobile node indicated by said first registration request message with a home address of said mobile node;

storing the matched Care-of-Address by said home agent server;

sending a second registration request message which requests a registration of said Care-of-Address from said mobile node to said SIP server;

storing a matching relation of a resource identifier (URI) of said mobile node indicated by said second registration request message and said Care-of-Address in an SIP information management table by said SIP server; and executing a communication procedure for session establishment between said mobile node and a correspondent node through said SIP server, wherein, in said communication procedure for session establishment, when an SIP session establishment request (INVITE) message which specifies a destination node using said resource identifier is sent from said correspondent node to said SIP server, said SIP server refers said SIP information management table, specifies said Care-of-Address of said mobile node which corresponds to said resource identifier of said destination node, and transfers said SIP session establishment request message to said Care-of-Address.

2. A method according to claim 1, wherein, in said communication procedure for said session establishment, said SIP server transfers said SIP session establishment request message to said Care-of-Address after updating said resource identifier of said destination node included in a start line of said SIP session establishment request message received from said correspondent node and being sent to said Care-of-Address;

said mobile node, upon receiving said SIP session establishment request message, transmits an SIP response message that specifies said Care-of-Address in a message body portion back to said SIP server; and said SIP server transmits said SIP response message to said correspondent node.

3. A method according to claim 2, wherein said correspondent node transmits to said mobile node a data packet with said Care-of-Address specified by said message body portion of said SIP response message used as the destination IP address after said communication procedure for session establishment has been completed.

4. A mobile communication system having a home network connected to an IP network and a plurality of visited networks connected to said IP network through packet data switching nodes, said home network including a home agent server for managing location information of a mobile node and a SIP (Session Initiation Protocol) server, wherein said home agent server has means that matches said Care-of-Address of said mobile node indicated by a location registration request message with a home address of said mobile node and stores the matched Care-of-Address of said mobile node in a memory when said location registration request message of a mobile IP is received from said mobile node, and said SIP server has:

means that matches said Care-of-Address of said mobile node indicated by said location registration request message with an SIP resource identifier of said mobile node and stores the matched Care-of-Address of said mobile node in an SIP information management table in a memory when an IP packet including an SIP location registration request message is received from said mobile node; and means that, when an IP packet including an SIP session establishment request (INVITE) message having a destination node that is specified by a resource identifier is received from a correspondent node of said mobile node, refers to said SIP information management table, identifies said Care-of-Address of said mobile node which corresponds to said resource identifier of said destination node, and transmits said IP packet including SIP session establishment request message to said Care-of-Address.

5. A system according to claim 4, wherein said SIP server receives from said mobile node an IP packet including an SIP session establishment request (INVITE) message with a Care-of-Address specified by a connection definition, and transfers said received packet to said correspondent node, thereby notifying said correspondent node of said Care-of-Address of said mobile node.

* * * * *